(12) United States Patent
Nelson

(10) Patent No.: US 6,783,337 B2
(45) Date of Patent: Aug. 31, 2004

(54) CHECK VALVE SEAL ASSEMBLY

(75) Inventor: Bryan E. Nelson, Lacon, IL (US)

(73) Assignee: Caterpillar Inc, Peoria, IL (US)

( * ) Notice: Subject to any disclaimer, the term of this patent is extended or adjusted under 35 U.S.C. 154(b) by 49 days.

(21) Appl. No.: 10/292,817

(22) Filed: Nov. 13, 2002

(65) Prior Publication Data

US 2004/0091376 A1 May 13, 2004

(51) Int. Cl.[7] .......................... F04B 53/00; F16K 25/00
(52) U.S. Cl. ................... 417/454; 417/570; 137/454.4; 137/454.5
(58) Field of Search ................. 417/454, 269, 417/570; 137/454.4, 454.5

(56) References Cited

U.S. PATENT DOCUMENTS

| | | | | |
|---|---|---|---|---|
| 2,138,194 A | * | 11/1938 | Pfauser | 417/269 |
| 2,658,716 A | * | 11/1953 | Winfree | 251/273 |
| 5,603,348 A | * | 2/1997 | Geringer | 137/514.7 |
| 6,035,828 A | * | 3/2000 | Anderson et al. | 123/446 |
| 6,192,921 B1 | * | 2/2001 | Plotz | 137/454.5 |
| 6,682,315 B2 | * | 1/2004 | Gens | 417/269 |

* cited by examiner

*Primary Examiner*—Charles G. Freay
(74) *Attorney, Agent, or Firm*—Finnegan, Henderson, Farabow, Garrett & Dunner

(57) ABSTRACT

A check valve assembly includes a plug having a first end and a second end spaced along a longitudinal axis of the check valve assembly. The check valve assembly also includes a first valve seat, wherein the first end of the plug sealingly contacts the first valve seat. A second valve seat is spaced from the first valve seat in a direction of the longitudinal axis. The check valve assembly further includes a resilient member between the plug and the second valve seat and a spring member urging the resilient member into sealing contact with the second valve seat and the plug.

20 Claims, 3 Drawing Sheets

CHECK VALVE SEAL ASSEMBLY

TECHNICAL FIELD

This invention relates generally to a seal assembly and, more particularly, to a check valve seal assembly for a pump.

BACKGROUND

Piston pumps are known to be used in hydraulically-actuated fuel injection systems. The reliable operation of such pumps and their components is significant to the overall operation of the engine. Moreover, the ability of such pumps and their components to operate free of maintenance is important to reduce downtime of the system. While reliable operation is an important design criteria, issues such as cost and ease of assembly influence the overall design of such pumps and their components.

In some systems, a piston pump pressurizes hydraulic fluid and supplies the pressurized fluid to a common rail, which in turn supplies hydraulic fluid to a plurality of hydraulically-actuated fuel injectors mounted in a diesel engine. The pump displaces high pressure fluid to the common rail via a check valve. The check valve attempts to prevent leakage of displaced high pressure fluid back into the pump during a suction stroke and to prevent leakage of high pressure fluid from an interior of the pump to an exterior of the pump. In order to prevent such leakages, the check valve requires two sealing points: one that prevents the leakage of fluid back into the pump and another that prevents leakage of pressurized fluid to an exterior of the pump.

While the pump may perform well in operation, the force of pressurized fluid created during a piston's discharge stroke and the vacuum force created during a piston's suction stroke require that a check valve assembly be manufactured with a tight tolerance and assembled with relatively high precision. Therefore, production of such pumps may be costly and complex.

The present invention provides a seal assembly that avoids some or all of the aforesaid shortcomings in the prior art.

SUMMARY OF THE INVENTION

In accordance with one aspect of the invention, a check valve assembly includes a plug having a first end and a second end spaced along a longitudinal axis of the check valve assembly. The check valve assembly also includes a first valve seat, wherein the first end of the plug sealingly contacts the first valve seat. A second valve seat is spaced from the first valve seat in a direction of the longitudinal axis. The check valve assembly further includes a resilient member between the plug and the second valve seat and a spring member urging the resilient member into sealing contact with the second valve seat and the plug.

In accordance with another aspect of the invention, a pump for supplying high-pressure fluid to a hydraulically-actuated fuel injection system for an engine includes a drive shaft configured to receive drive torque from the engine, a drive plate coupled to the drive shaft, and at least one sleeve coupled to the drive plate and having an internal bore. The at least one sleeve is reciprocatingly driven by the drive plate to pressurize fluid. The pump also includes an outlet passage in fluid communication with the internal bore and a check valve assembly configured to allow pressurized fluid above a predetermined pressure to pass through the outlet passage to a collection outlet. The check valve assembly includes two sealed contact regions spaced along an axis of the check valve assembly that prevent leakage through the check valve assembly and that prevent leakage from an interior of the pump to an exterior of the pump.

In accordance with yet another aspect of the invention, a method of assembling a check valve assembly includes coupling a plug with a bore in an outlet passage of a pump housing and sealingly contacting a first end of the plug with a first valve seat defined by the bore. The method further includes urging a resilient member into sealing contact with a second valve seat defined by the bore. The second valve seat is spaced from the first valve seat in a direction of a longitudinal axis of the check valve assembly.

It is to be understood that both the foregoing general description and the following detailed description are exemplary and explanatory only and are not restrictive of the invention.

DETAILED DESCRIPTION

Reference will now be made in detail to the exemplary embodiments of the invention, examples of which are illustrated in the accompanying drawings. Wherever possible, the same reference numbers will be used throughout the drawings to refer to the same or like parts.

Figure 1:
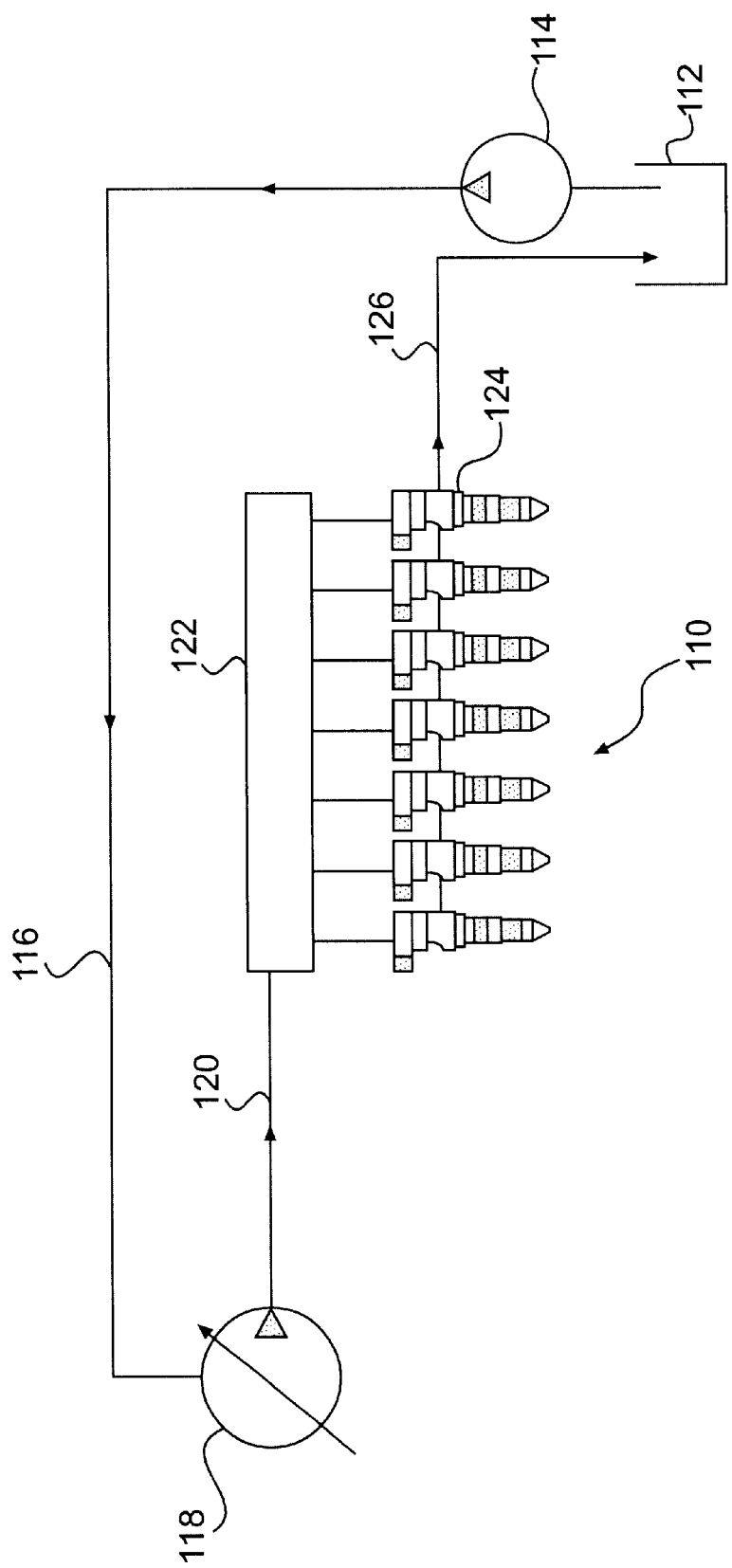
FIG. 1 is a schematic illustration of a hydraulically-actuated fuel injection system according to an exemplary embodiment of the present invention.

Referring now to FIG. 1, a working fluid circuit 110 for a hydraulically-actuated fuel injection system may make up a component of an internal combustion engine. The working fluid circuit 110 may include a source of low pressure working fluid 112, for example, an engine's lubricating oil tank. A supply pump 114 may supply working fluid through a low pressure supply line 116 to a high pressure axial piston pump 118. The axial piston pump 118 may then supply high pressure working fluid along the high pressure supply line 120 to a high pressure common fluid rail 122. The high pressure fluid rail 122 is fluidly connected to each of the fuel injectors 124 and selectively supplies high pressure working fluid to drive the fuel injectors 124. After the high pressure working fluid is utilized by the individual fuel injectors 124, the working fluid may be returned to the low pressure fluid source 112 via a drain passage 126.

Figure 2:
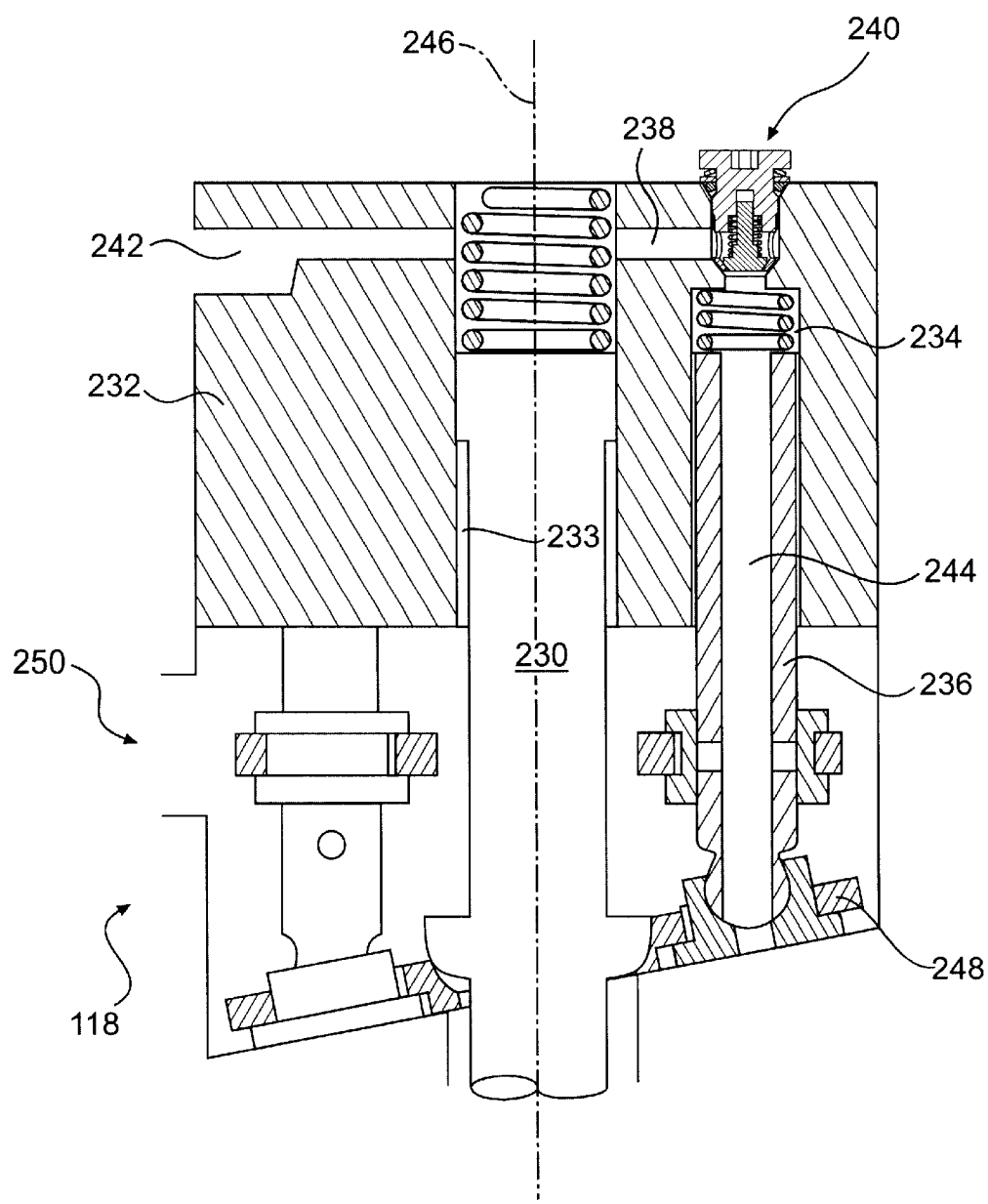
FIG. 2 is a cross-sectional diagrammatic view of an axial piston pump according to an exemplary embodiment of the present invention.

Referring now to FIG. 2, the pump 118 may include a rotating shaft 230 that is coupled directly to the output of the engine (not shown), such that the rotation rate of the shaft 230 is directly proportional to the rotation rate of the drive shaft (not shown) of the engine. A rotating pump housing 232 may be fixedly attached to the shaft 230 via, for example, a spline engagement 233 so that the shaft 230 and the pump housing 232 rotate together. Any other suitable arrangement may be used to fixedly secure the pump housing 232 to the shaft 230.

The pump housing 232 may include a plurality of openings 234 for receiving a plurality of sleeves 236. For example, the pump housing 232 may include five openings 234 for receiving five sleeves 236. The pump housing 232 may also include a plurality of high pressure outlet passages 238 associated with the sleeves 236. The high pressure outlet passage 238 for each sleeve 236 may include a check valve assembly 240 to provide one-way fluid flow from the opening 234 through outlet passage 238. The high pressure outlet passage 238 for each opening 234 may fluidly communicate with a collection outlet 242. The collection outlet 242 may communicate with the high pressure supply line 120 (FIG. 1). The collection outlet 242 may be formed in any suitable manner so as to provide for eventual connection with the high pressure supply line 120.

Each sleeve 236 may be formed in a cylindrical shape having an axial bore 244 extending through the sleeve 236 in a direction parallel to a central longitudinal axis 246 of the pump 118. Each sleeve 236 may be coupled to a drive plate 248 in a manner that allows for angular relative movement and limited axial relative movement between the sleeve 236 and the drive plate 248.

Pump housing 232 may also include an inlet passage 250 extending from a supply fluid source, for example, the supply pump 114. The inlet passage 250 and the outlet passages 238 may be formed in any suitable manner allowing for the flow of fluid into and out of axial bore 244 of the sleeve 236 during a pumping stroke.

Figure 3:
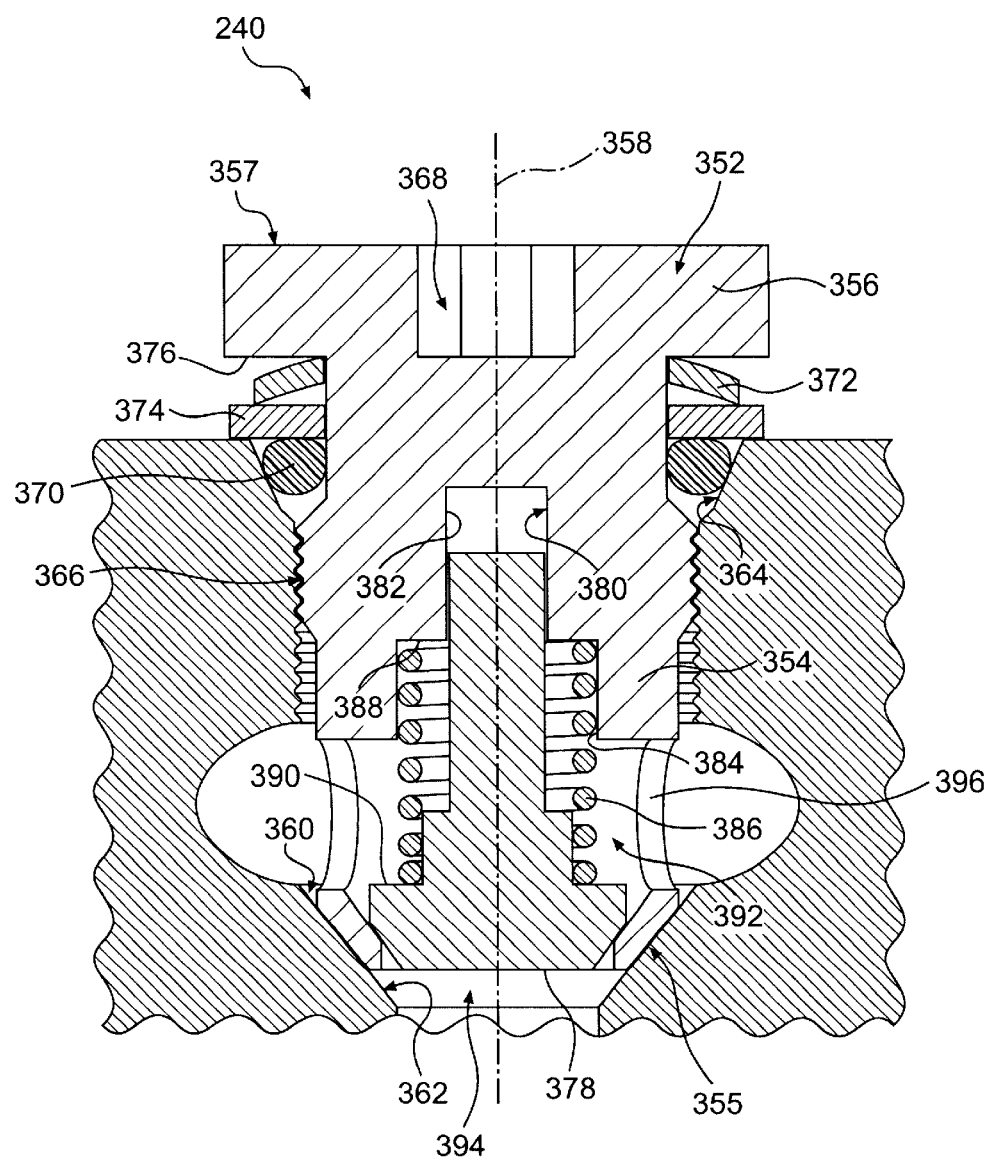
FIG. 3 is a cross-sectional diagrammatic view of a check valve seal assembly of the pump shown in FIG. 2.

FIG. 3 illustrates the check valve assembly 240 of the pump 118 in FIG. 2. The check valve assembly 240 includes a plug 352 having a shank portion 354 terminating in a free first end 355 and a head portion 356 at a second end 357. The first and second ends 355, 357 are spaced along a longitudinal axis 358 of the check valve assembly 240. The head portion 356 may have a larger lateral cross-section than a remainder of the plug 352. The plug 352 has a predetermined length in a direction of the longitudinal axis 358. The predetermined length may vary within a tolerance.

The check valve assembly 240 further includes a bore 360 in the pump housing 232 configured to receive the plug 352. The bore 360 defines a first valve seat 362 and a second valve seat 364. The plug 352 may be coupled to the pump housing 232 via threaded connection 366 with the bore 360. The head portion 356 of the plug 352 may comprise a receptacle 368 for receiving, for example, a tightening device capable of coupling the plug 352 with the bore 360 to a predetermined torque level. The receptacle 368 may define a cross-section configured as, for example, a hexagon, a torx, or the like. Alternatively or additionally, a perimeter of the head portion 356 may be configured, for example, as a hexagon, to be receivable in a ratchet or other type of tightening device.

The check valve assembly 240 also includes a resilient member 370 and a spring member 372 around the shank portion 354 of the plug 352. The resilient member 370 may be, for example, an O-ring, and the spring member 372 may be, for example, a metal spring washer or a metal wave washer. A washer 374, for example, a flat metal washer, may also be disposed around the shank portion 354 between the resilient member 370 and the spring member 372. The spring member 372 may be between the washer 374 and a surface 376 of the head portion 356 that faces towards the first end 355.

Additionally, the check valve assembly 240 includes a valving member 378 slidable in a bore 380 defined by the plug 352. The bore 380 may include a first section 382 have a first diameter and a second section 384 having a second diameter greater than the first diameter. A spring 386 may be disposed between a surface 388 delimiting the second section 384 and a surface 390 of the valving member 378. The surface 388 delimiting the second section 384 faces towards the first end 355 of the plug 352, and the surface 390 of the valving member 378 faces towards the second end 357. The plug 352 also includes a hollow region 392 at its first end 355 housing a portion of the valving member 378. The hollow region 392 is fluidly communicable with the axial bore 244 of the sleeve 236 via an axial opening 394 in the first end 355. The hollow region 392 is also fluidly communicable with the collection outlet 238 via one or more lateral holes 396 in the shank portion 354.

Industrial Applicability

In operation, rotation of the drive shaft of the engine causes rotation of the shaft 230 of the pump 118. This rotation of the shaft 230 causes the sleeves 236 to reciprocate in accordance with the axial rise and fall of the drive plate 248. During a suction stroke of a sleeve 236 (associated with movement of the sleeve from its top-dead-center, distal-most position to its bottom-dead-center, proximal-most position), low pressure fluid is drawn from the source of low pressure fluid 112 into the pump housing 232 through the inlet passage 250. The low pressure fluid then passes through the center of the drive plate 248 and into the axial bore 244 of the sleeve 236.

During a discharge stroke of a sleeve 236 (associated with movement of the piston from its bottom-dead-center, proximal-most, position to its top-dead-center, distal-most, position), the sleeve 236 moves in a distal direction thereby pressurizing the fluid within the axial bore 244. Some of the pressurized fluid is then expelled into the outlet passage 238, beyond the check valve 240, into the collection outlet 242, out of the pump housing 232, and through the high pressure supply line 120 to the common rail 122. The pressurized fluid passes through the check valve assembly 240 when its pressure exceeds the force of the spring 386 acting on the valving member 378.

Before operation, the plug 352 may be screwed into the bore 360 of the pump housing 232 to a first predetermined torque level such that the first end 355 of the plug 352 sealingly contacts the first valve seat 362. As the plug 352 is screwed into the bore 360, the gap between the resilient member 370, the washer 374, the spring member 372, and the head portion 356 decreases.

At the first predetermined torque level, the spring member 372 is urged against the resilient member 370, for example, by the head portion 356, thereby providing a sealing contact between the resilient member 370, the plug 352, and the second valve seat 364. The first predetermined torque level may compress the spring member 372, and the spring member 372 may compress the resilient member 370 into an area bounded by the head portion 356 of the plug 352, the shank portion 354 of the plug 352, the second valve seat 364, the washer 374, and/or the spring member 372.

The spring member 372 may have a sufficiently high spring index such that the spring member 372 is capable of generating enough force to maintain the resilient member 370 in a sealed relationship while under the pressure of fluid passing through the check valve 240. For example, the spring member 372 may be capable of generating a sealing pressure greater than 28 MPa.

The check valve assembly 240 according to an exemplary embodiment of the invention provides sealing contact at two valve seats 362, 364 spaced along a longitudinal axis 358 of the check valve assembly 240. The compression force of the spring member 372 on the resilient member 370 provides a reliable seal, while providing a loose manufacturing tolerance for the plug 352 and the bore 360. For example, a predetermined longitudinal length of the plug 352 of the check valve assembly 240 may vary within a coarser tolerance than a check valve that does not include the spring member 372. As a result, the manufacturing cost of a pump with the check valve assembly 240 may be reduced, and the assembly of such a pump may be simplified.

It will be apparent to those skilled in the art that various modifications and variations can be made in the check valve seal assembly without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A check valve assembly, comprising:
    a plug having a first end and a second end spaced along a longitudinal axis of the check valve assembly;
    a first valve seat, the first end of the plug sealingly contacting the first valve seat;
    a second valve seat spaced from the first valve seat in a direction of the longitudinal axis;
    a resilient member between the plug and the second valve seat; and
    a spring member urging the resilient member into sealing contact with the second valve seat and the plug.

2. The assembly of claim 1, wherein the first valve seat and the second valve seat are defined by a pump housing.

3. The assembly of claim 1, further including a washer between the resilient member and the spring member.

4. The assembly of claim 3, wherein the plug includes a head portion at the second end.

5. The assembly of claim 4, wherein a surface of the head portion contacts the spring member opposite the washer.

6. The assembly of claim 3, wherein the washer is a flat washer.

7. The assembly of claim 1, wherein the resilient member is an O-ring.

8. The assembly of claim 1, wherein the spring member is one of a metal spring washer and metal wave washer.

9. The assembly of claim 1, wherein the plug has a predetermined length along the longitudinal axis, the length varying within a tolerance.

10. The assembly of claim 1, further including a valving member slidable in a bore of the plug.

11. The assembly of claim 10, further including a spring configured to urge the valving member toward the first end of the plug.

12. A pump for supplying high-pressure fluid to a hydraulically-actuated fuel injection system for an engine, comprising:
    a drive shaft configured to receive drive torque from the engine;
    a drive plate coupled to the drive shaft;
    at least one sleeve coupled to the drive plate and having an internal bore, the at least one sleeve being reciprocatingly driven by the drive plate to pressurize fluid;
    an outlet passage in fluid communication with the internal bore; and
    a check valve assembly configured to allow pressurized fluid above a predetermined pressure to pass through the outlet passage to a collection outlet, the check valve assembly including two sealed contact regions spaced along an axis of the check valve assembly that prevent leakage through the check valve assembly and a biasing member urging a sealing member into a sealing engagement at one of the two sealed contact regions to prevent leakage from an interior of the pump to an exterior of the pump.

13. The pump according to claim 12, wherein the check valve assembly includes:
    a plug having a first end and a second end spaced along the axis;
    a first valve seat, the first end of the plug sealingly contacting the first valve seat to define a first sealed contact region;
    a second valve seat spaced from the first valve seat in a direction of the axis;
    the sealing member being a resilient member between the plug and the second valve seat; and
    the biasing member being a spring member urging the resilient member into sealing contact with the second valve seat and the plug to define a second sealed contact region.

14. The pump of claim 12, wherein the pump is a fixed-displacement pump.

15. The pump of claim 14, wherein the pump is an axial piston pump.

16. The pump of claim 15, wherein the pump is a variable flow pump.

17. A method of assembling a check valve assembly, comprising:
    coupling a plug with a bore in an outlet passage of a pump housing;
    sealingly contacting a first end of the plug with a first valve seat defined by the bore;
    applying a spring force to a resilient member; and
    urging the resilient member into sealing contact with a second valve seat defined by the bore, the second valve seat being spaced from the first valve seat in a direction of a longitudinal axis of the check valve assembly.

18. The method of claim 17, wherein said sealing and said urging include applying a predetermined torque to the plug.

19. The method of claim 18, wherein said applying includes urging a spring member toward the resilient member.

20. The method of claim 19, wherein said applying further includes urging the spring member into contact with a washer, the washer contacting the resilient member.

* * * * *